(12) United States Patent
Lopez et al.

(10) Patent No.: US 11,753,089 B2
(45) Date of Patent: Sep. 12, 2023

(54) INTEGRATED DRAG REDUCTION SYSTEM FOR A VEHICLE WHEN TRAILERING

(71) Applicant: GM Global Technology Operations LLC, Detroit, MI (US)

(72) Inventors: Richard J. Lopez, Bloomfield Hills, MI (US); William D. Detrisac, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 17/519,669

(22) Filed: Nov. 5, 2021

(65) Prior Publication Data

US 2023/0143008 A1    May 11, 2023

(51) Int. Cl.
*B62D 35/00*    (2006.01)
*B60J 7/14*    (2006.01)
*B60J 7/04*    (2006.01)

(52) U.S. Cl.
CPC .......... *B62D 35/007* (2013.01); *B60J 7/041* (2013.01); *B60J 7/141* (2013.01); *B62D 35/001* (2013.01)

(58) Field of Classification Search
CPC ..... B60J 7/041; B60J 7/14; B60J 7/141; B60J 7/16; B60J 7/1607; B62D 35/001; B62D 35/007

USPC ................. 296/100.01, 100.02, 180.1, 180.2
See application file for complete search history.

(56) References Cited

U.S. PATENT DOCUMENTS

| | | | | |
|---|---|---|---|---|
| 4,506,870 A * | 3/1985 | Penn | ................. | B62D 35/007 |
| | | | | 296/180.1 |
| 5,398,985 A * | 3/1995 | Robinson | ................. | B60J 7/223 |
| | | | | 296/180.1 |
| 9,394,013 B2 * | 7/2016 | Yamaguchi | ............ | B62D 37/02 |
| 10,899,207 B2 * | 1/2021 | Williams | ............... | B60J 7/1607 |
| 10,926,607 B2 * | 2/2021 | Williams | ........... | B60H 1/00014 |
| 11,046,161 B2 * | 6/2021 | Williams | .............. | D06F 57/125 |
| 11,524,729 B2 * | 12/2022 | Gaughf, Jr. | .......... | B62D 35/007 |
| 11,584,207 B2 * | 2/2023 | Williams | ............... | B60L 8/003 |
| 2010/0276967 A1 * | 11/2010 | Berg | ................. | B62D 33/0273 |
| | | | | 296/180.1 |
| 2015/0246696 A1 * | 9/2015 | Froling | ............... | B62D 35/001 |
| | | | | 296/180.1 |

* cited by examiner

*Primary Examiner* — Jason S Daniels
(74) *Attorney, Agent, or Firm* — CANTOR COLBURN LLP

(57) ABSTRACT

A pickup truck including a passenger compartment, a cargo bed operatively coupled to the passenger compartment, and a selectively deployable drag reduction system mounted at the cargo bed. The selectively deployable drag reduction system includes a deflector that is shiftable between a non-deployed configuration and a deployed configuration. In the deployed configuration the deflector is exposed to an airflow passing over the pickup truck.

11 Claims, 4 Drawing Sheets

INTEGRATED DRAG REDUCTION SYSTEM FOR A VEHICLE WHEN TRAILERING

INTRODUCTION

The subject disclosure relates to the art of vehicles and, more particularly, to a vehicle having an integrated drag reduction system when trailering.

Vehicles are often used to tow trailers, boats, recreational vehicles (RV), and the like. Tow vehicles typically include a hitch of some form that supports a ball. The ball is received in a trailer coupler supported on a towed vehicle. In many cases, particularly with RV's and larger trailers, drag can become a concern. That is, the towed vehicle may project into an airstream moving over the towing vehicle. This projection into the airstream impacts system aerodynamics that can have a negative impact on fuel efficiency and/or range and, in some cases, vehicle handling characteristics.

Certain tow vehicles, such as pickup trucks, may be affected more by airstream disturbances than other tow vehicles. That is, given the location and height of a pickup truck bed, towed vehicles are more likely to extend into the airstream. As such, many pickup truck owner employ a drag reduction device. However, it is not always desirable to travel with a drag reduction device. Removing a drag reduction device may be time consuming and could require dedicated storage. Accordingly, users would welcome a drag reduction system that is not always active and which does not need to be removed and stored.

SUMMARY

Disclosed, in accordance with a non-limiting example, is a pickup truck including a passenger compartment, a cargo bed operatively coupled to the passenger compartment, and a selectively deployable drag reduction system mounted at the cargo bed. The selectively deployable drag reduction system includes a deflector that is shiftable between a non-deployed configuration and a deployed configuration. In the deployed configuration the deflector is exposed to an airflow passing over the pickup truck.

In addition to one or more of the features described herein the cargo bed includes a cargo bed cover, the selectively deployable drag reduction system being integrated into the cargo bed cover.

In addition to one or more of the features described herein the deflector includes a first deflector and a second deflector arranged downstream of the first deflector.

In addition to one or more of the features described herein the first deflector extends a first distance from the cargo bed and the second deflector extends a second distance from the cargo bed, the second distance being greater than the first distance.

In addition to one or more of the features described herein the first deflector is arranged at a first angle relative to the cargo bed and the second deflector is arranged at a second angle relative to the cargo bed, the second angle being distinct from the first angle.

In addition to one or more of the features described herein the selectively deployable drag reduction system includes a first side member and a second side member spaced from the first side member, the deflector being mounted between the first side member and the second side member.

In addition to one or more of the features described herein the first side member and the second side member are selectively rotatable relative to the cargo bed.

In addition to one or more of the features described herein a cargo support extends between the first side member and the second side member.

In addition to one or more of the features described herein the deflector comprises a selectively pivoting deflector that forms part of a cargo bed cover extending across the cargo bed.

In addition to one or more of the features described herein an actuation system is operatively connected to the selectively deployable drag reduction system, the actuation system controls deployment of the deflector.

Also disclosed, in accordance with a non-limiting example, is a selectively deployable drag reduction system mountable to a cargo bed of a pickup truck. The selectively deployable drag reduction system includes a deflector shiftable between a non-deployed configuration and a deployed configuration. In the deployed configuration the deflector is exposed to an airflow passing over the pickup truck.

In addition to one or more of the features described herein the selectively deployable drag reduction system is integrated into a cargo bed cover.

In addition to one or more of the features described herein the deflector includes a first deflector and a second deflector arranged downstream of the first deflector.

In addition to one or more of the features described herein the first deflector is configured to extend a first distance from the cargo bed and the second deflector is configured to extend a second distance from the cargo bed, the second distance being greater than the first distance.

In addition to one or more of the features described herein the first deflector is arranged at a first angle and the second deflector is arranged at a second angle that is distinct from the first angle.

In addition to one or more of the features described herein the selectively deployable drag reduction system includes a first side member and a second side member spaced from the first side member, the deflector being mounted between the first side member and the second side member.

In addition to one or more of the features described herein the first side member and the second side member are selectively rotatable.

In addition to one or more of the features described herein a cargo support extends between the first side member and the second side member.

In addition to one or more of the features described herein the deflector comprises a selectively pivotal deflector that forms part of a cargo bed cover configured to extend across the cargo bed.

In addition to one or more of the features described herein an actuation system is operatively connected to the selectively deployable drag reduction system, the actuation system controls deployment of the deflector member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
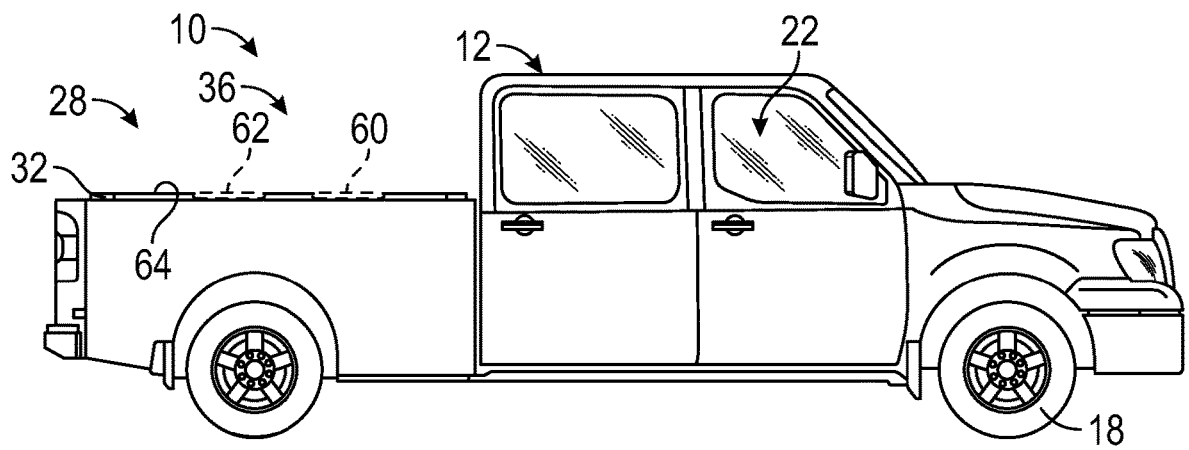
FIG. 1 depicts a pickup truck including a selectively deployable drag reduction system in a non-deployed configuration, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
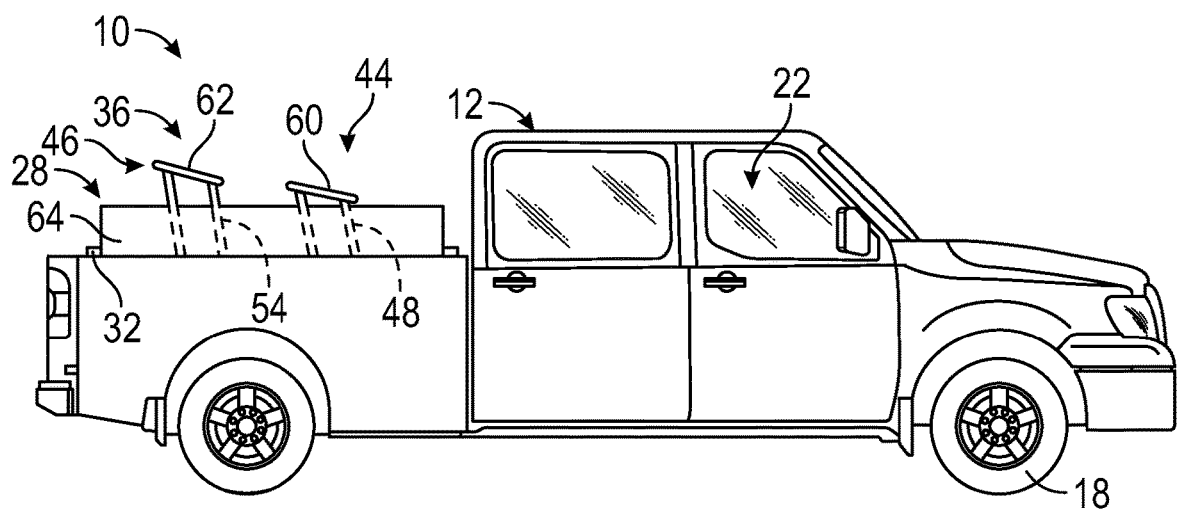
FIG. 2 depicts the pickup truck of FIG. 1 with the selectively deployable drag reduction system in a deployed configuration, in accordance with a non-limiting example.
Figure 3:
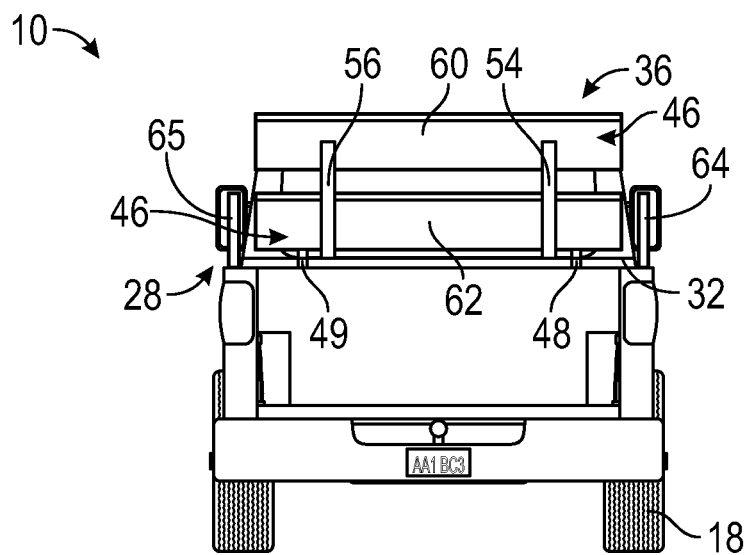
FIG. 3 depicts a rear view of the pickup truck of FIG. 2, in accordance with a non-limiting example.
Figure 4:
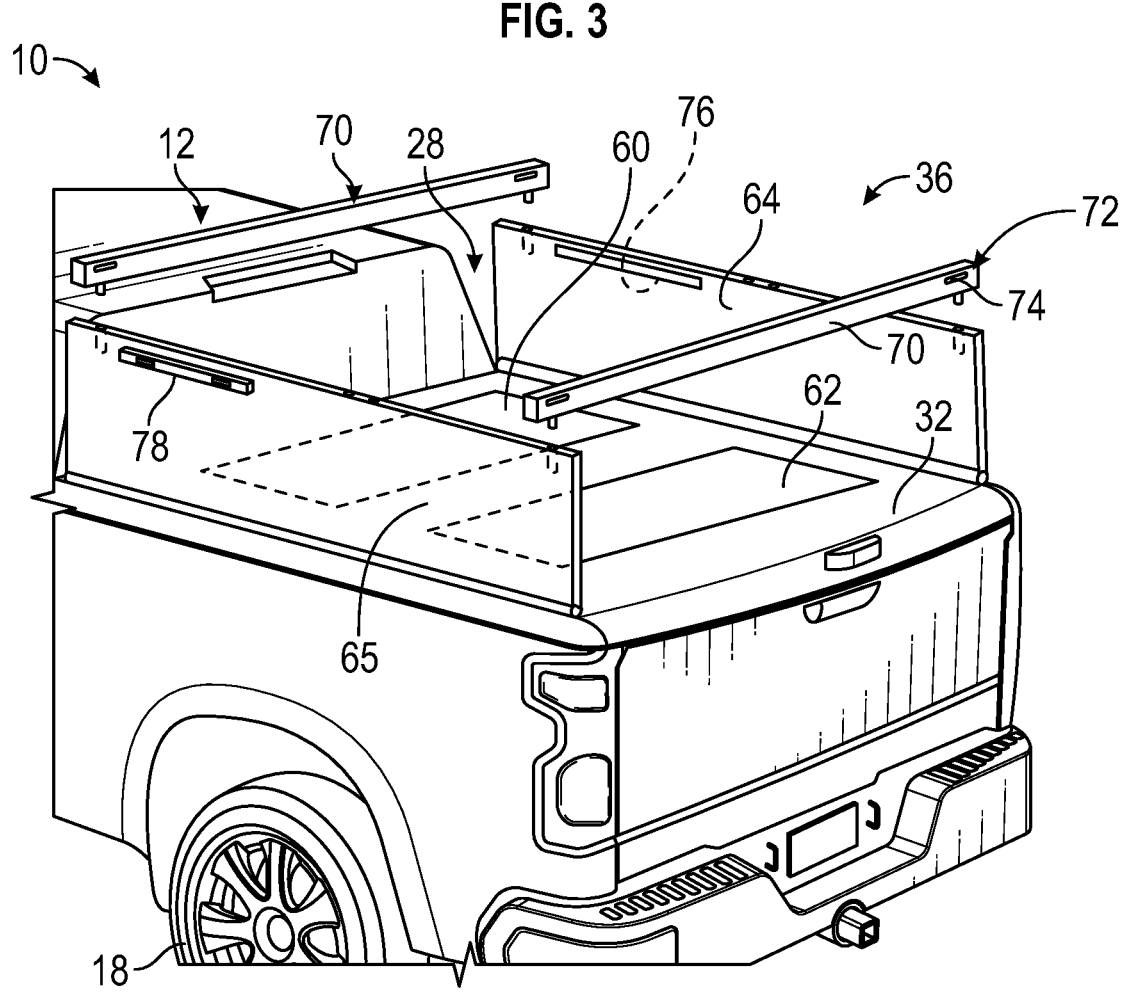
FIG. 4 depicts a rear view of the pickup truck of FIG. 2 showing the selectively deployable drag reduction system partially stowed in a cargo bed cover, in accordance with a non-limiting example.

A pickup truck, in accordance with a non-limiting example, is indicated generally at 10 in FIG. 1. Pickup truck 10 includes a body 12 supported on a frame (not shown) and a plurality of wheels, one of which is indicated at 18. Body 12 defines a passenger compartment 22 and a cargo bed 28. Cargo bed 28 is disposed aft of passenger compartment 22. In a non-limiting example, pickup truck 10 includes a cargo bed cover 32, such as a tonneau cover, and a selectively deployable drag reduction system 36. In a non-limiting example, selectively deployable drag reduction system 36 is incorporated into and may project outwardly from cargo bed cover 32 as shown in FIGS. 2-4. In another non-limiting example, selectively deployable drag reduction system 30 may be mounted to a floor (not separately labeled) of cargo bed 28.

Referring to FIGS. 2-4 and with continued reference to FIG. 1, selectively deployable drag reduction system 36 includes a first deflector assembly 44 and a second deflector assembly 46. Second deflector assembly 46 is disposed aft of first deflector assembly 44. First deflector assembly 44 includes a first support 48 and a second support 49. First and second supports 48 and 49 project outwardly from cargo bed cover 32. Second deflector assembly 46 includes a first support member 54 and a second support member 56. Supports 48, 49, 54, and 56 may be secured to and selectively stowed within cargo bed cover 32 (FIG. 4) or, in another non-limiting example, be secured to cargo bed 28 and simply extend through cargo bed cover 32.

A first deflector 60 extends between first support 48 and second support 49. A second deflector 62 extends between first support member 54 and second support member 56. In a non-limiting example, first support 48 and second support 49 extend a first distance from cargo bed 28. First support member 54 and second support member 56 extend a second distance from cargo bed 28 that is greater than the first distance. In this manner, second deflector 62 is positioned above first deflector 60. In a non-limiting example, the first distance and the second distance may be adjustable so as to accommodate a wide range of towed vehicle heights. Height adjustments may be made manually or automatically by, for example, adjusting telescoping components. In a non-deployed configuration such as shown in FIG. 4, first deflector 60 and second deflector 62 are stowed within cargo bed cover 32.

In a non-limiting example, the first deflector 60 may be disposed at a first angle relative to cargo bed 28 and second deflector 62 may be disposed at a second angle relative to cargo bed 28. The first angle and the second angle may be similar or different depending upon a geometry of the towed vehicle. Likewise, the first angle and the second angle may be selectively adjustable to accommodate a wide range of towed vehicle heights.

In a non-limiting example, selectively deployable drag reduction system 36 may include a first side member 64 and a second side member 65. First and second side members 64 and 65 form side deflectors that direct air outwardly of pickup truck 10. In a non-limiting example, first side member 64 may be pivotally connected to a first side (not separately labeled) of cargo bed cover 32 and second side member 65 may be pivotally connected to a second side (also not separately labeled) of cargo bed cover 32. First and second side members 64 and 65 may be selectively deployed to guide air currents outwardly of body 12.

In a non-limiting example, pickup truck 10 may include cargo supports such as shown at 70 and 72. Each cargo support may connect between side members 64 and 65 and include tie down points such as shown at 74 on cargo support 70. Additional tie down points, such as shown at 76 and 78 may be provided on external surfaces of side members 64 and 65 respectively. Cargo supports 70 and 72 may be used to secure ladders, watercraft, or the like to pickup truck 10

Figure 5:
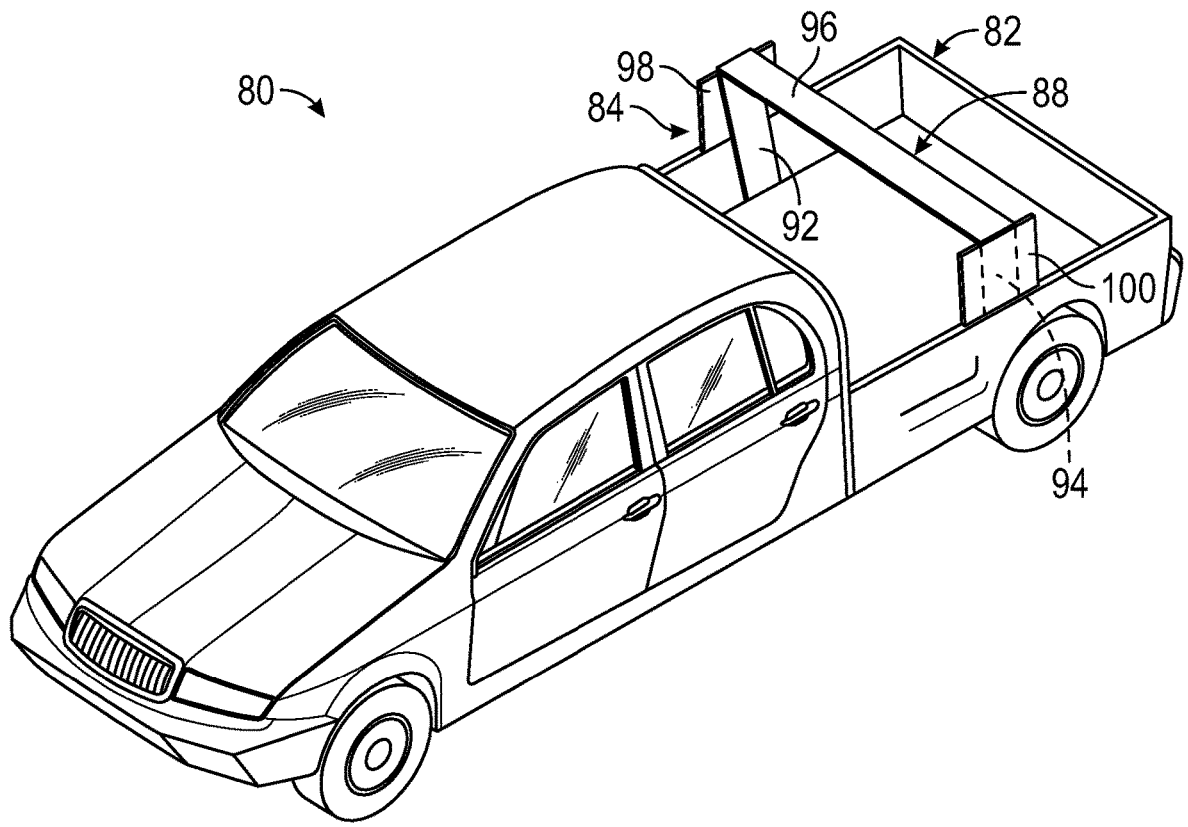
FIG. 5 depicts an upper left view of a pickup truck including selectively deployable drag reduction system, in accordance with another non-limiting example.
Figure 6:
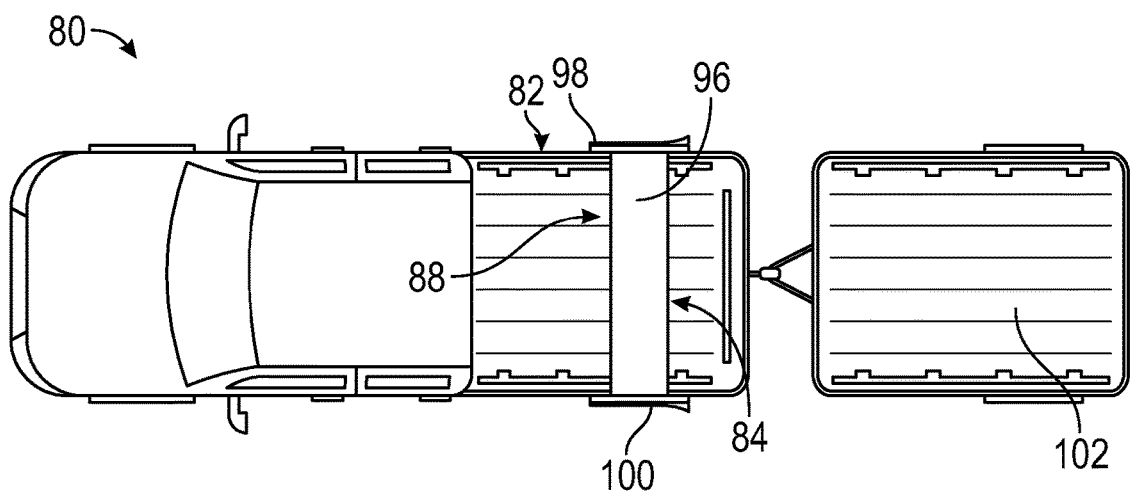
FIG. 6 depicts a top view of the pickup truck of FIG. 5 coupled to a towed vehicle, in accordance with a non-limiting example.

At this point, it should be understood that while shown as including two deflectors, in other non-limiting examples, other configurations are contemplated. In FIGS. 5 and 6, a pickup truck 80 includes cargo bed 82 supporting a selectively deployable drag reduction system 84 having a single deflector assembly 88. In a non-limiting example, deflector assembly 88 includes a first support 92 that extends from cargo bed 82 and a second support 94 that extends from cargo bed 82 and is spaced from first support 92. A deflector 96 is operatively connected to and between first support 92 and second support 94. Deflector assembly 88 also includes a first side member 98 and a second side member 100.

In a non-limiting example, first and second supports 92 and 94 may be adjusted so as to position deflector 96 at a selected height so as to accommodate various towed vehicles. Height adjustments may be made manually, or automatically by, for example, adjusting telescoping components. Similarly, deflector 96 may be positioned at various angles so as to accommodate various towed vehicles. That is, the angle of deflector 96 may be adjusted to direct airflow over, and not into, a forward section of a towed vehicle. In a nonlimiting example, first side member 98 and second side member 100 may be adjusted to accommodate various widths of a towed vehicle such as shown at 102 in FIG. 6. Specifically, first and second side members may be inline with side portions (not separately labeled) of cargo bed 82 or pivoted outwardly to direct airflow to side portions and around towed vehicle 102.

Figure 7:
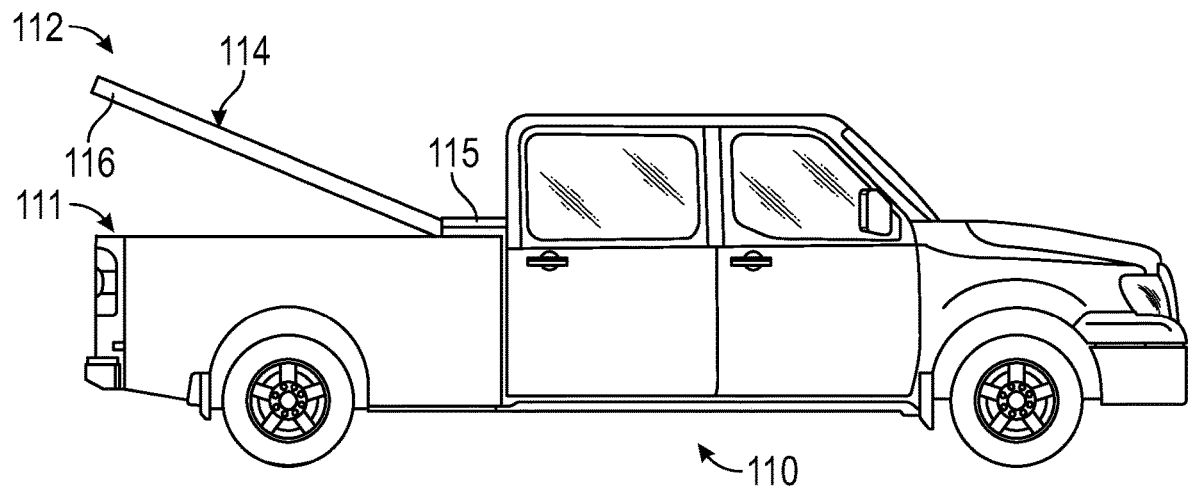
FIG. 7 depicts a pickup truck including a selectively deployable drag reduction system a deployed configuration, in accordance with yet another non-limiting example.

In a non-limiting example depicted in FIG. 7, a pickup truck 110 is shown to include a cargo bed 111 having a selectively deployable drag reduction system 112 in the form of a cargo bed cover 114. In a non-limiting example, cargo bed cover 114 includes a first or stationary portion 115 and a second portion that forms a deflector 116. Deflector 116 is pivotally connected to cargo bed 111 and may transition from a non-deployed configuration (not shown) in which cargo bed cover 114 extends across cargo bed 111 and a deployed configuration such as shown in FIG. 7 in which deflector 116 is raised upwardly so as to guide airflow over a towed vehicle.

Figure 8:
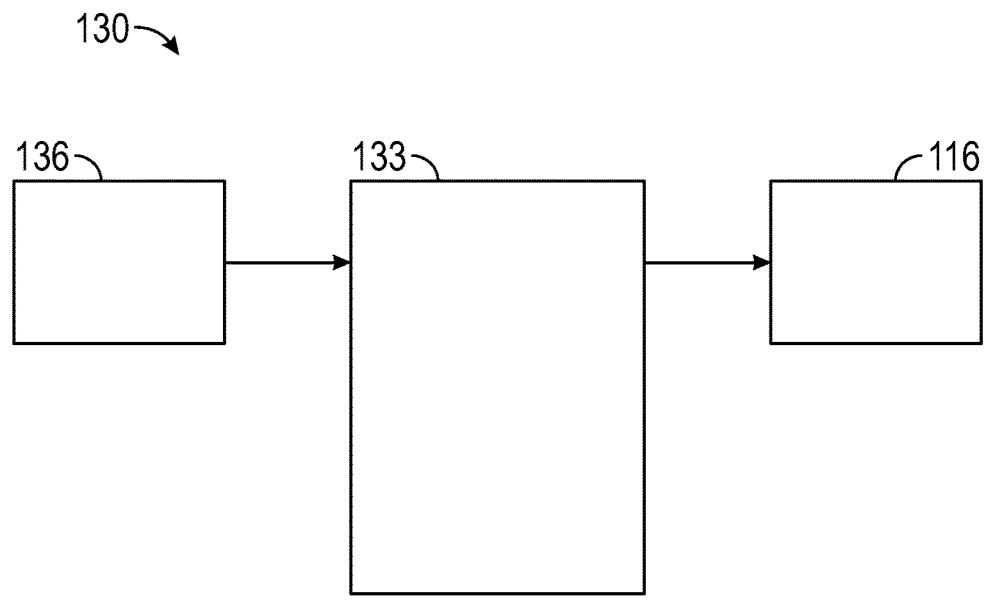
FIG. 8 depicts a block diagram illustrating an actuation system associated with the selectively deployable drag reduction system, in accordance with a non-limiting example.

In a non-limiting example, deflector portion 116 may be deployed and locked into place manually such as through locking telescopic members, hydraulic pistons, and the like (not shown), or automatically such as through an actuator (not shown) in pickup truck 110. In a non-limiting example, pickup truck 110 may include an actuation system 130 as shown in FIG. 8. Actuation system 130 includes a control module 133 that is operatively connected to an actuator 136 that may take the form of a button, toggle, soft switch, or the like in pickup truck 110.

In a non-limiting example, control module 133 is also connected to deflector 116. With this arrangement, an operator may deploy and set a selected deployment angle of deflector 116. At this point, it should be understood that while shown in connection with pickup truck 110, actuation system 130 may be integrated into pickup truck 10 and/or pickup truck 80 and may be employed to control angles of the side members 64 and/or 65 and/or deflector members 60 and/or 62 so as to accommodate various sized towed vehicles.

Further, in a non-limiting example, it should be understood that the location of actuator 136 may vary. That is, actuator 136 may be arranged in passenger compartment 22, at cargo bed 28 or may be included in a computer App and thus be wirelessly connected to control module 133. For example, an App based control can be incorporated where a user provides desired function (drag reduction or cargo management) characteristics of the towed vehicle (height and width) and based on experimental data, side members 64 and/or 65, and/or deflector members 60 and/or 62, and/or deflector portion 116 may be adjusted. That is, the App communicates with control module 133 to set a height and/or angle of side members 64 and/or 65, and/or deflector members 60 and/or 62, and/or deflector portion 116. A manual override that accommodates user input position adjustment may also be included.

Further, in another non-limiting example, another App based control, that self-calibrates, may be used to reduce drag. In either non-limiting example, above App, shifts a height and/or angle of side members 64 and/or 65, and/or deflector members 60 and/or 62, and/or deflector portion 116 into a base position based on trailer or cargo mode selection and user input of towed vehicle characteristics. The user may then proceed to a suitable calibration location (e.g., flat ground where constant speed can be held). Once at the suitable calibration location, the App communicates with control module 133 to adjust a height and/or angle of side members 64 and/or 65, and/or deflector members 60 and/or 62, and/or deflector portion 116 to reduce propulsion power needed to maintain a set speed to as to increase range for a tow vehicle.

In a non-limiting example, control module 133 may be used to adjust a height and/or angle of side members 64 and/or 65, and/or deflector members 60 and/or 62, and/or deflector portion 116 to assist in braking if selected by a user.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A pickup truck comprising:
a passenger compartment;
a cargo bed operatively coupled to the passenger compartment;
a cargo bed cover mounted to the cargo bed; and
a selectively deployable drag reduction system integrated into the cargo bed cover, the selectively deployable drag reduction system including a first deflector and a second deflector arranged downstream of the first deflector, the first deflector extending a first distance from the cargo bed and the second deflector extending a second distance from the cargo bed that is greater than the first distance, each of the first deflector and the second deflector being shiftable between a non-deployed configuration and a deployed configuration, wherein in the deployed configuration the first deflector and the second deflector are exposed to an airflow passing over the pickup truck.

2. The pickup truck according to claim 1, wherein the first deflector is arranged at a first angle relative to the cargo bed and the second deflector is arranged at a second angle relative to the cargo bed, the second angle being distinct from the first angle.

3. The pickup truck according to claim 1, further comprising an actuation system operatively connected to the selectively deployable drag reduction system, the actuation system controls deployment of the deflector.

4. A pickup truck comprising:
a passenger compartment;
a cargo bed operatively coupled to the passenger compartment; and
a selectively deployable drag reduction system mounted at the cargo bed, the selectively deployable drag reduction system including a deflector being shiftable between a non-deployed configuration and a deployed configuration, wherein in the deployed configuration the deflector is exposed to an airflow passing over the pickup truck,
wherein the selectively deployable drag reduction system includes a first side member and a second side member spaced from the first side member, the deflector being mounted between the first side member and the second side member, and
wherein the first side member and the second side member are selectively rotatable relative to the cargo bed.

5. The pickup truck according to claim 4, further comprising a cargo support extending between the first side member and the second side member.

6. A selectively deployable drag reduction system mountable to a cargo bed of a pickup truck comprising:
a cargo bed cover;

a first deflector and a second deflector integrated into the cargo bed cover, the first deflector is configured to extend a first distance from the cargo bed and the second deflector is configured to extend a second distance from the cargo bed that is greater than the first distance shiftable between a non-deployed configuration and a deployed configuration, wherein in the deployed configuration the deflector is exposed to an airflow passing over the pickup truck.

7. The selectively deployable drag reduction system according to claim 6, wherein the first deflector is arranged at a first angle and the second deflector is arranged at a second angle that is distinct from the first angle.

8. The selectively deployable drag reduction system according to claim 6, wherein the selectively deployable drag reduction system includes a first side member and a second side member spaced from the first side member, the deflector being mounted between the first side member and the second side member.

9. The selectively deployable drag reduction system according to claim 8, wherein the first side member and the second side member are selectively rotatable.

10. The selectively deployable drag reduction system according to claim 8, further comprising a cargo support extending between the first side member and the second side member.

11. The selectively deployable drag reduction system according to claim 6, further comprising an actuation system operatively connected to the selectively deployable drag reduction system, the actuation system controlling deployment of the deflector.

* * * * *